March 3, 1931. L. MAASS 1,794,859
TENONING MACHINE
Filed Feb. 20, 1928
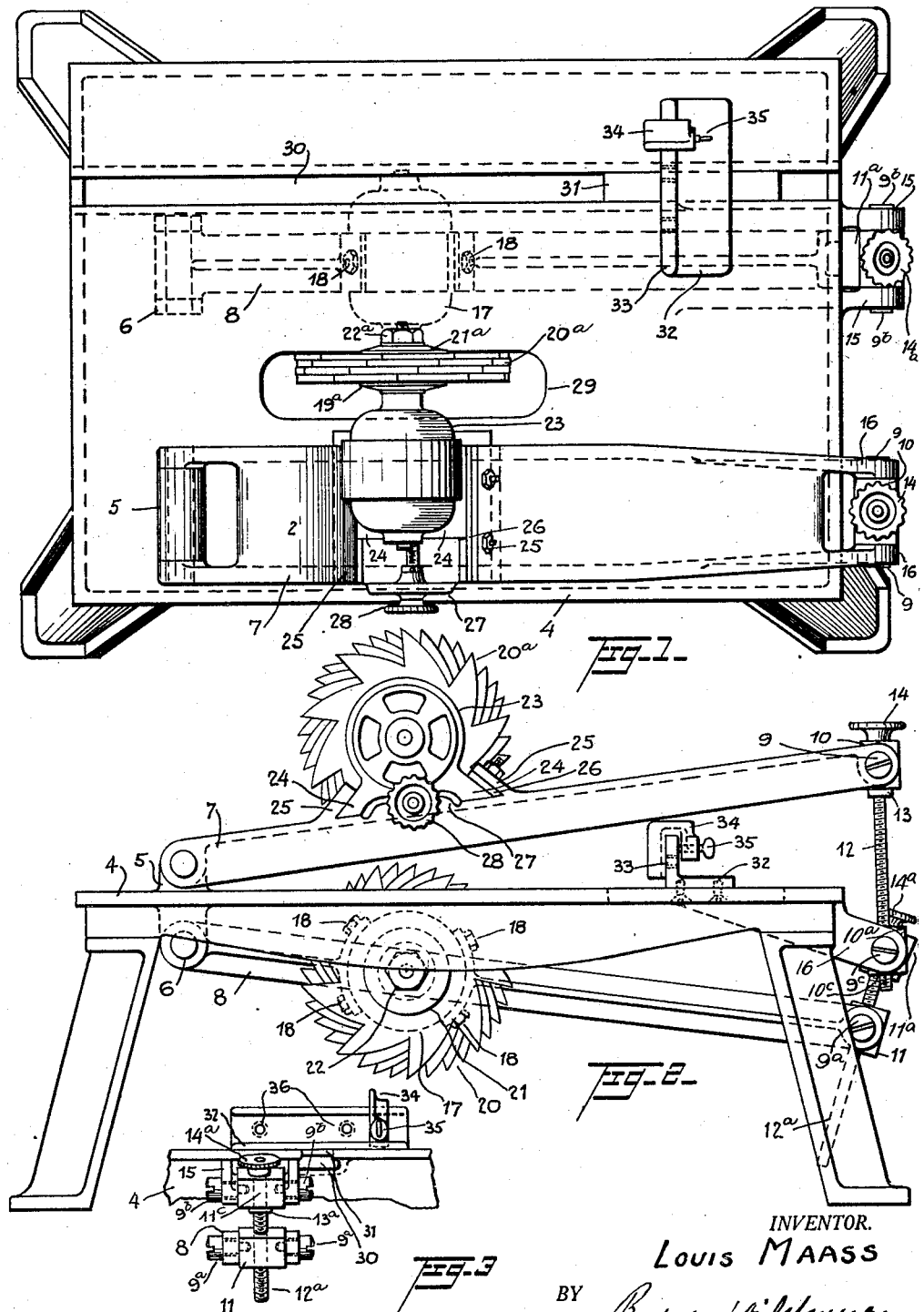
INVENTOR.
Louis MAASS
BY
*his* ATTORNEY.

Patented Mar. 3, 1931

1,794,859

UNITED STATES PATENT OFFICE

LOUIS MAASS, OF HARTFORD, CONNECTICUT

TENONING MACHINE

Application filed February 20, 1928. Serial No. 255,674.

My invention relates to machinery which serves to mill tenons onto lumber boards, and in particular to light tenoning machines which are used by cabinet makers, furniture manufacturers etc., and the objects of my invention are:

1st, to enhance the versatility of a tenoner;

2nd, to make a tenoning machine simple in construction and handling for unskilled operators;

3rd, to eliminate mechanical transmissions;

4th, to limit the dangerous revolving parts to the working parts themselves;

5th, to reserve the table top for the saw cutting the top of the tenon only;

6th, to save power;

7th, to avoid parts which are apt to be impaired by dirt and dust;

8th, to provide a machine which can be adapted for double tenoning;

9th, to allow free alignment of top and bottom saws relative to each other as well as to the table;

10th, to secure perfect adjustment of the saws relatively to each other;

11th, to reduce the weight of a tenoning machine so that it can be moved readily;

12th, to have all the controls and adjustments for the operation within reach of the operator.

I attain these objects by the mechanism illustrated in the accompanying drawings in which:

Figure 1 is a top view of my invention,

Figure 2 is a side view of my invention, and

Figure 3 shows a front elevation of a portion of my improvement.

Similar numerals refer to similar parts thruout the several views.

On top of and below the four-legged table 4 are fulcrumed in bearings 5 and 6 the levers 7 and 8 respectively. At their free ends these levers are forked and carry, rotatively suspended between pivot-screws 9, 9ª respectively, the lugs 10 and 11 respectively.

Extending from one end of the table, and below the table top, I provide brackets 15 and 16, within which auxiliary lugs 11ª and 10ª respectively are pivotally mounted on supporting screws 9ᵇ and 9ᶜ respectively. The auxiliary lug 10ª is below and in substantially vertical alignment with the lug 10 in the free end of the lever 7, and the auxiliary lug 11ª is above and in substantially vertical alignment with the lug 11, in the free end of the lever 8. These auxiliary lugs 11ª and 10ª are provided with screw receiving openings 10ᶜ and 11ᶜ, the opening in the lug 10ª being threaded.

Lug 11 is tapped to take the threaded part of adjustment screw 12ª. The upper unthreaded end of that screw is provided with a flange 13ª and, at the end, with knurled handle 14ª, and it is rotatably fitted upon the lug 11ª which is rotatably suspended, by pivot-screws 9ᵇ, between brackets 15 below the table 4. Operation of handle 14ª will therefore positively move the free end of the lever 8 towards or away from the table 4. Correspondingly lever 7 is moved up and down by parts 14, 13, 12, 10ª and 10, similar to those parts above referred to, the lug 10ª being rotatively suspended, by pivot screws 9ª, between brackets 16 below the edge of table 4.

High-speed motor 17 is, by means of screws 18, assembled in, and forms part of, lever 8. On the spindle of that motor is solidly mounted a flange not shown, but similar to the flange 19ª on the spindle of the motor 23 against which flange are replaceably fastened the saws 20, by flanged collar 21 and nut 22 on the end of the spindle.

The spindle of another motor 23 carries similar parts 19ª, 20ª, 21ª and 22ª. The two electric motors are of the ball-bearing type, or in some other way the end-play of the spindles is eliminated. Dovetails 24 form part of the housing of motor 23 and fit the slide 25 (with gib 26) which forms part of lever 7. A hub 27 on the side of the lever 7 carries adjustment screw 28 by means of which the motor 23 can be adjusted in said slide transverse to the lever 7.

There is a clearance hole 29 in the table 4 for the rotary saws 20 on motor 17. The plane in which these saws are facing flange 21 is fixed. If more saws are added on the spindle of that motor, the width of the combined saws is extended towards motor 23 and to keep the corresponding width of saws on the spindle of motor 23 in alignment with these saws on motor 17, motor 23 is accordingly adjusted in slide 25 on lever 7. Perpendicular to the axes of the two motors extends, across the table 4, a slot 30 which takes key 31 at the bottom of angle 32. When the operator moves the angle by hand along that slot 30, the face 33 of the angle 32 remains parallel to the axes of the motors.

The upper edge of the angle 32 carries clamp 34, which may be set at any point of the length of the face 33 by thumb screw 35. That clamp serves as an end stop for the boards so that they are uniformly gaged when, in the operation of the machine, the tenon is cut at their other end. Tapped holes 36 on angle 32 serve to take screws by which an extension may be clamped to the face of 33.

A single switch for the control of the current supply for both motors may be provided in the front of the machine, and the leads are brought from there by way of the fulcrum points of the levers to the respective motors.

To protect the operator from the dangers of the high speed tools, sectional or semi-automatic guards are used, as they are customarily applied in this art.

The electric motors may be small and of low capacity, and a machine driven by fractional horsepower motors can handle all tenoning requirements which ordinarily occur. For the work on exceptionally heavy boards and of sawing very long tenons, the machine lends itself to cutting in steps on a production basis, on account of the simple means of adjustment.

I do not want to limit the scope of my invention to the exact design illustrated, but various other forms of execution, for instance the adjustment of the motors towards each other may be brought about by vertical slides instead of swing levers, may be adapted for a tenoning machine of this kind.

I claim:

1. The combination, in a tenoning machine, of a table to support the work, and means slidable thereon for pushing the work laterally thereof longitudinally of the table, with parallel fulcrumed levers extending longitudinally of the table and pivoted to lugs extending above and below said table, means for adjusting said levers toward and away from said table, a gang of saws directly driven by motors mounted on said levers, while the saw gangs project from the opposite sides of said levers, and an opening in said table through which said saw gangs face each other, the saw gang on the upper lever projecting from the same side thereof as the work pushing means.

2. In a tenoning machine, the combination of a table having a top to support the work, two operatively separated, independently motor driven gangs of saws, above and below said table top, in vertical alignment with each other and operating in a plane vertical to said table top, and independently operable means rockably mounted above and below said table top, to adjust said gangs of saws and driving means to and from each other and said table, in a plane vertical to said table.

3. In a tenoning machine, the combination of a table having a top to support the work, two operatively separated, independently motor driven gangs of saws, above and below said table top, in vertical alignment with each other and operating in a plane vertical to said table top, independently operable means rockably mounted above and below said table top, to adjust said gangs of saws and driving means to and from each other and said table, in a plane vertical to said table, and means to adjust one of said gangs of saws and one of said motors relatively to the other of said gangs of saws and the other of said motors in the direction of their axes, transversely of said table top.

4. In a tenoning machine, the combination of a table having a top to support the work, two operatively separated, independently motor driven gangs of saws, above and below said table top in vertical alignment with each other and operating in a plane vertical to said table top, motors directly driving said gangs of saws, mounted above and below said table top near the opposite sides thereof, with their axes substantially parallel to the top and bottom faces of said table top lying in a common vertical plane substantially perpendicular to said table top, and independently operable means rockably mounted above and below said table top, to adjust said gangs of saws and driving means to and from each other and said table, in a plane vertical to said table.

5. In a tenoning machine, the combination of a table having a top to support the work, a plurality of operatively separated, independently motor driven gangs of saws above and below said table top, in vertical alignment with each other, and operating in a plane vertical to said table top, a plurality of motors, disposed respectively above and below said table top near opposite sides thereof, with their axes substantially parallel to the top and bottom faces of said table top lying in a common vertical plane substantially perpendicular to said table top, directly connected to and independently driving each of said gangs of saws, and independently operable means supporting said motors, rockably mounted above and below said table top near the opposite sides thereof, to adjust said gangs of saws and said motors to and from each other and said table, in a plane vertical to said table top.

6. In a tenoning machine, the combination of a table having a top to support the work, a plurality of operatively separated, independently motor driven gangs of saws above and below said table top, in vertical alignment with each other, and operating in a plane vertical to said table top, a plurality of motors, disposed respectively above and below said table top near opposite sides thereof, with their axes substantially parallel to the top and bottom faces of said table top lying in a common vertical plane substantially perpendicular to said table top, directly connected to and independently driving each of said gangs of saws, independently operable means supporting said motors, rockably mounted above and below said table top near the opposite sides thereof, to adjust said gangs of saws and said motors to and from each other and said table, in a plane vertical to said table top, and means to adjust one of said gangs of saws and one of said motors relatively to the other of said gangs of saws and the other of said motors to and from each other, in the direction of their axes parallel to and transversely of said table top.

7. The combination in a tenoning machine, of a table having a top to support the work, and means slidable thereon for pushing the work laterally thereof longitudinally of said table top, two operatively separated, independently motor driven gangs of saws, above and below said table top, in vertical alignment with each other and operating in a plane vertical to said table top, motors driving said gangs of saws mounted above and below said table top near the opposite sides thereof with their axes substantially parallel to the top and bottom faces of said table top lying in a common vertical plane substantially perpendicular to said table top, and independently operable means, rockably mounted above and below said table top, to adjust said gangs of saws and driving means to and from each other and said table top, in a plane vertical to said table.

LOUIS MAASS.